United States Patent
Johanning

(10) Patent No.: US 6,768,220 B2
(45) Date of Patent: Jul. 27, 2004

(54) CIRCUIT ARRANGEMENT FOR A GENERATOR, ESPECIALLY AN INTEGRATED STARTER GENERATOR

(75) Inventor: Hans-Peter Johanning, Steinbach (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/632,182

(22) Filed: Jul. 31, 2003

(65) Prior Publication Data

US 2004/0021443 A1 Feb. 5, 2004

Related U.S. Application Data

(63) Continuation of application No. PCT/DE02/00316, filed on Jan. 29, 2002.

(30) Foreign Application Priority Data

Feb. 13, 2001 (DE) .......................................... 101 06 622

(51) Int. Cl.$^7$ ............................................... F02N 11/08
(52) U.S. Cl. ...................... 307/10.1; 307/61; 123/179.1
(58) Field of Search ............................. 307/10.7, 10.1, 307/10.6, 48, 49, 60, 61, 63; 123/179.1, 179.3, 179.28

(56) References Cited

U.S. PATENT DOCUMENTS

| | | | | |
|---|---|---|---|---|
| 4,004,208 A | * | 1/1977 | Tamminen | .................. 320/104 |
| 5,555,864 A | * | 9/1996 | Miyakawa et al. | .... 123/179.28 |
| 5,694,311 A | | 12/1997 | Umeda et al. | ................. 363/89 |
| 6,321,707 B1 | * | 11/2001 | Dunn | ...................... 123/179.3 |

FOREIGN PATENT DOCUMENTS

| DE | 44 35 005 A1 | 4/1996 | ............. H02J/7/34 |
|---|---|---|---|
| DE | 196 46 043 A1 | 5/1998 | ........... B60R/16/02 |
| DE | 197 55 050 A1 | 7/1999 | ........... B60R/16/02 |
| DE | 195 46 132 C2 | 10/2000 | ............ H02H/9/00 |

OTHER PUBLICATIONS

"Kurbelwellenstartgenerator (KSG)—Basis für zukünftige Fahrzeugkonzepte", Alfred Krappel.
"Moderne Starter–Generatoren für Kraftfahrzeuge mit Asynchronmaschinen und feldorientierter Regelung" Heinz Schäfer, Ludwig Wähner.

* cited by examiner

*Primary Examiner*—Bao Q. Vu
(74) *Attorney, Agent, or Firm*—Baker Botts L.L.P.

(57) ABSTRACT

The circuit arrangement has two battery connections for a first battery, a DC/AC converter whose AC input can be connected to a power converter, a control unit and a component for decoupling the voltage of the first battery from the voltage on DC input of the DC/AC converter. Said component has exactly two power connections and at least one control connection. A voltage drop between the power connections can be varied by means of the control connection. The circuit arrangement has at least one connection enabling a consumer system to be connected parallel to the DC input of the DC/AC converter. When the first battery is connected, the first battery and the component form a series connection via the power connections thereof, said series connection being mounted parallel to the DC input of the DC/AC converter. The control unit is connected to the control connection of the element.

12 Claims, 2 Drawing Sheets

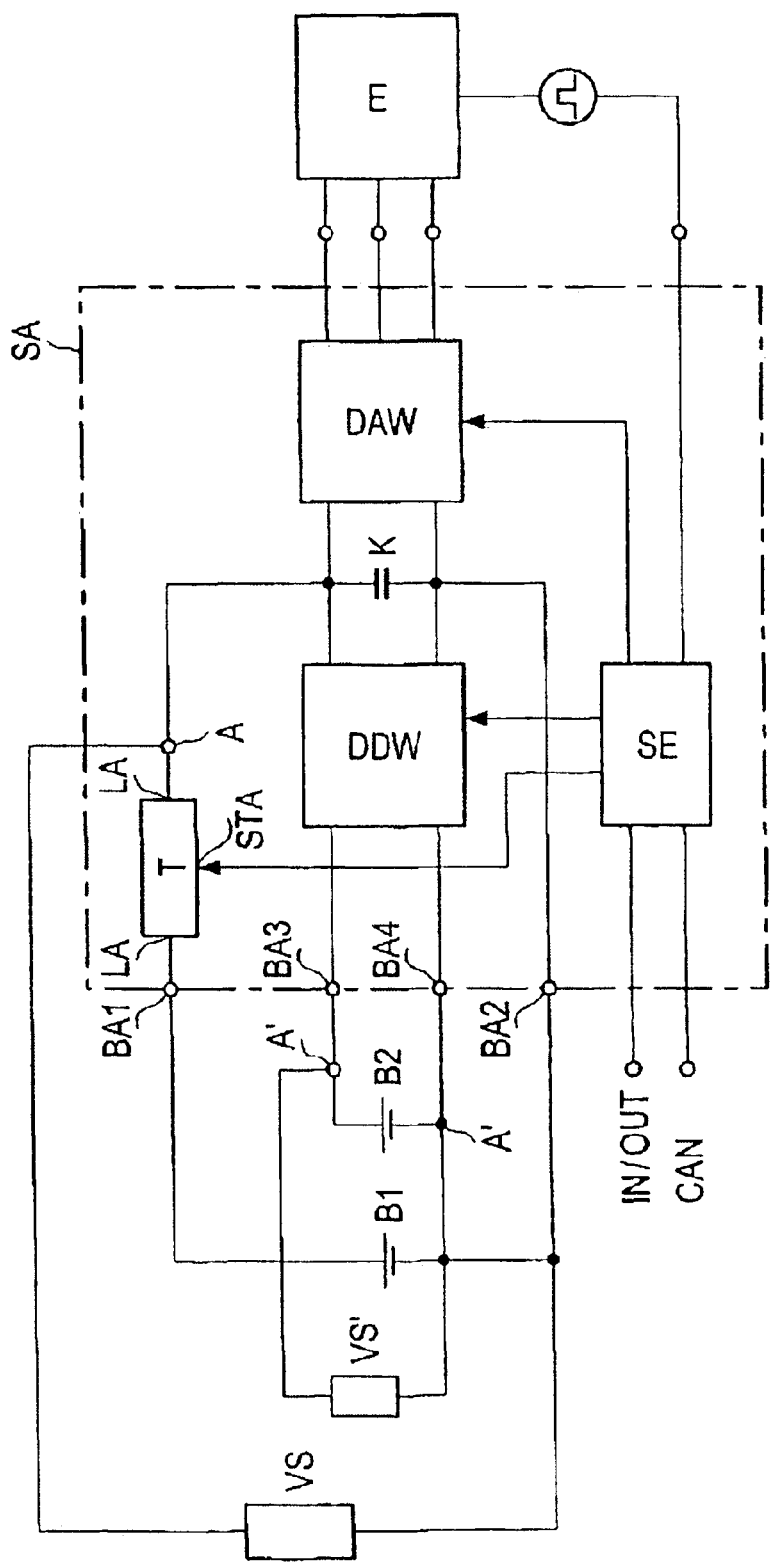

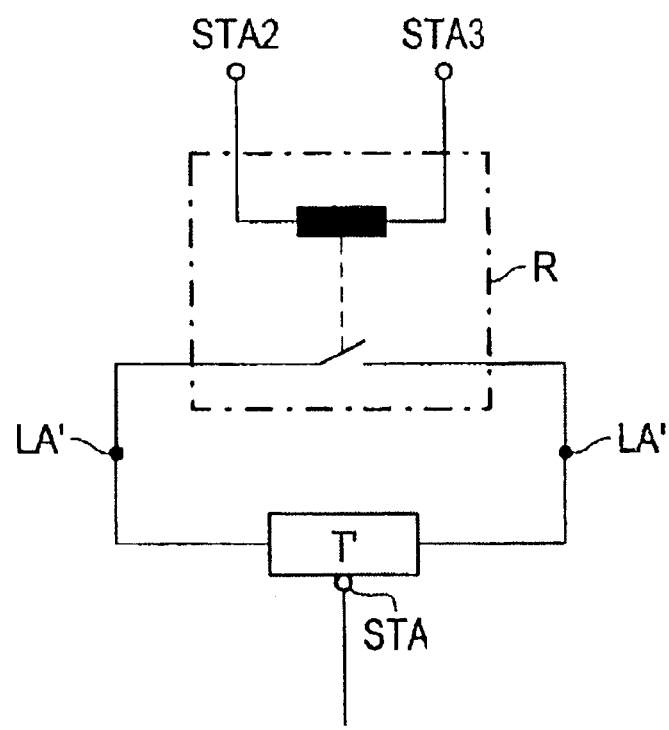

CIRCUIT ARRANGEMENT FOR A GENERATOR, ESPECIALLY AN INTEGRATED STARTER GENERATOR

CROSS REFERENCE TO RELATED APPLICATION

This application is a continuation of copending International Application No. PCT/DE02/00316 filed Jan. 29, 2002 and claiming a priority date of Feb. 13, 2001, which designates the United States.

TECHNICAL FIELD OF THE INVENTION

The invention relates to a circuit arrangement for a generator. In this case a circuit arrangement is defined as a circuit which is implemented in the form of one or more structurally separate units.

BACKGROUND OF THE INVENTION

A generator can be designed as a starter-generator. A starter-generator is used as part of a vehicle electrical system in a motor vehicle and performs two functions. On the one hand the starter-generator can work as a generator and charge a vehicle battery or supply a load system in the motor vehicle. In this case, the starter-generator converts mechanical energy into electrical energy. On the other hand the starter-generator functions as a starter for an internal combustion engine of a motor vehicle and in this case is supplied by the vehicle battery.

Such a starter-generator is described in A. Krappel et al. "Kurbelwellenstartgenerator (KSG)—Basis für zukünftige Fahrzeugkonzepte" ["Crankshaft starter-generator—basis for future vehicle systems"], 2nd Edition, Expert-Verlag, pages 24–29. The starter-generator has a first battery with an open-circuit voltage of 36 volts and a second battery with an open-circuit voltage of 12 volts. The first battery supplies a high-load load system if the starter-generator cannot meet the energy demand of the high-load load system. This occurs if, for example, the asynchronous machine is not operating or if the starter-generator is in starter mode. For this purpose, the starter-generator has a terminal via which the high-load load system can be connected in parallel with the first battery. The same applies correspondingly for the second battery and a low-load load system.

The first battery is connected in parallel with a capacitor and in parallel with the DC-side input of a DC/AC transformer. The AC-side input of the DC/AC transformer is connected to an asynchronous machine. The asynchronous machine converts electrical energy into mechanical energy and vice versa. If the asynchronous machine generates more energy than is consumed by the high-load load system, the asynchronous machine charges the first battery via the DC/AC transformer and supplies electrical energy to the high-load load system. The same applies correspondingly for the second battery and the low-load load system.

In order to ensure that the second battery is not destroyed by the high voltage which is present at the DC-side input of the DC/AC transformer and which is generally approximately 42 volts in this case, the second battery is connected in parallel with a first input of a DC/DC transformer. The second input of the DC/DC transformer is connected in parallel with the DC-side input of the DC/AC transformer. The DC/DC transformer converts the high voltage at the second input into a lower voltage, e.g. 14 volts, at the first input, so that the second battery can be charged without being destroyed. This also allows the low-load load system to be supplied with the low voltage by the asynchronous motor.

In the starter mode, the first battery supplies energy to the DC/AC transformer. The second battery can support the first battery in this case. For this purpose, the DC/DC transformer converts the low voltage at the first input into a high voltage at the second input of the DC/DC transformer. A control unit controls the DC/DC transformer and the DC/AC transformer.

It is sought to raise the power limit of the asynchronous motor, since the power requirement of the load systems in motor vehicles will increase continuously in the future. It is also desirable to achieve the highest possible power limit because the maximum deliverable power of the asynchronous motor decreases in the generator mode in the case of high rotational speeds of the internal combustion engine. The power limit of the asynchronous motor is determined by the voltage at the DC-side input of the DC/AC transformer. The higher the permissible voltage at the DC-side input of the DC/AC transformer, the higher the power limit of the asynchronous motor. However, the voltage at the DC-side input of the DC/AC transformer must never be so high that the first battery is destroyed or damaged. If the open-circuit voltage of the first battery is 36 volts, for example, the voltage at the DC-side input of the DC/AC transformer must not be more than approximately 42 volts for an extended period. This permissible maximum voltage is dependent on the type and the temperature of the first battery. Since the open-circuit voltage of the first battery codetermines the permissible maximum voltage, the open-circuit voltage of the first battery limits the power which can be generated by the asynchronous motor.

The open-circuit voltage of the first battery is fixed at 36 volts as a result of standardization. In order to ensure compatibility with the standard, it is not possible to increase the open-circuit voltage of the first battery and thus the voltage at the DC-side input of the DC/AC transformer in order to increase the power limit of the asynchronous motor.

The problem of the limited maximum deliverable power of the asynchronous motor also occurs in the case of a generator which is designed not as a starter-generator but as a simple electric generator.

SUMMARY OF THE INVENTION

The invention addresses the problem of specifying a circuit arrangement for a generator, which circuit arrangement allows the generator to have a higher power limit in comparison with the prior art and to be compatible with the standard at the same time.

The problem can be solved by a circuit arrangement for a generator, particularly an integrated starter-generator, comprising two battery terminals for a first battery, at least one DC/AC transformer, whose AC-side input can be connected to an energy converter, a component comprising at least two power terminals and at least one control terminal for isolating the voltage at the first battery from the voltage at the DC-side input of the DC/AC transformer, wherein a voltage drop between the power terminals can be varied continuously or incrementally via the control terminal, a control unit which is connected to the control terminal of the component, at least one terminal via which a load system can be connected directly in parallel with the DC-side input of the DC/AC transformer. When the first battery is connected, a series circuit is formed by the first battery and the component via its power terminals, said series circuit being connected in parallel with the DC-side input of the DC/AC transformer and in parallel with the load system at the same time.

The component may include at least one MOSFET transistor. The component can be a parallel circuit comprising a transistor and a relay, and the component may have three control terminals, of which the first control terminal is connected to the transistor and the second control terminal and the third control terminal are connected to the relay. The circuit arrangement may further comprise two further battery terminals for a second battery, a DC/DC transformer, wherein, when the second battery in connected, the second battery is connected in parallel with the first input of the DC/DC transformer, and the second input of the DC/DC transformer is connected in parallel with the DC-side input of the DC/AC transformer.

The problem can also be solved by a generator having a circuit arrangement comprising two battery terminals for a first battery, at least one DC/AC transformer, whose AC-side input can be connected to an energy converter, a component comprising at least two power terminals and at least one control terminal for isolating the voltage at the first battery from the voltage at the DC-side input of the DC/AC transformer, wherein a voltage drop between the power terminals can be varied continuously or incrementally via the control terminal, a control unit which is connected to the control terminal of the component, at least one terminal via which a load system can be connected directly in parallel with the DC-side input of the DC/AC transformer, wherein, when the first battery is connected, a series circuit is formed by the first battery and the component via its power terminals, said series circuit being connected in parallel with the DC-side input of the DC/AC transformer and in parallel with the load system at the same time, and wherein the generator is configured as an integrated starter-generator.

The component may include at least one MOSFET transistor. The component can be a parallel circuit comprising a transistor and a relay, and the component may have three control terminals, of which the first control terminal is connected to the transistor and the second control terminal and the third control terminal are connected to the relay. The generator may further comprise two further battery terminals for a second battery, a DC/DC transformer, wherein, when the second battery in connected, the second battery is connected in parallel with the first input of the DC/DC transformer, and the second input of the DC/DC transformer is connected in parallel with the DC-side input of the DC/AC transformer.

The problem may further be solved by a vehicle electrical system comprising a generator having a circuit arrangement comprising:

two battery terminals for a first battery, at least one DC/AC transformer, whose AC-side input can be connected to an energy converter, a component comprising at least two power terminals and at least one control terminal for isolating the voltage at the first battery from the voltage at the side input of the DC/AC transformer, wherein a voltage drop between the power terminals can be varied continuously or incrementally via the control terminal, a control unit which is connected to the control terminal of the component, at least one terminal via which a load system can be connected directly in parallel with the DC-side input of the DC/AC transformer, wherein, when the first battery is connected, a series circuit is formed by the first battery and the component via its power terminals, said series circuit being connected in parallel with the DC-side input of the DC/AC transformer and in parallel with the load system at the same time, wherein the first battery is connected to the two battery terminals, the energy converter is connected to the AC-side input of the DC/AC transformer, and wherein the voltage at the DC-side input of the DC/AC transformer is not higher than a predefined voltage at any time.

The energy converter may be configured as an asynchronous machine. The second battery can be connected to the two further battery terminals, and the open-circuit voltage of the second battery can be lower than the open-circuit voltage of the first battery.

The problem can also be solved by an operating method for a vehicle electrical system, comprising the steps of:

providing a first battery, providing a DC/AC transformer having a DC-side input, providing a component having two power terminals for varying a voltage drop across the terminals, isolating the voltage at the first battery from the voltage at the DC-side input of the DC/AC transformer, varying a voltage drop between the power terminals continuously or incrementally, controlling the component in such a way that a constant voltage is essentially present at the first battery, irrespective of the voltage at the DC-side input of the DC/AC transformer.

The component allows the voltage at the DC-side input of the DC/AC transformer to be isolated from the voltage at the first battery. As a result, a sufficiently high voltage can be present, at the DC-side input of the DC/AC transformer, to allow a high power limit of the energy converter without destroying the first battery. At the same time the open-circuit voltage of the first battery can still be 36 volts, thereby ensuring compatibility with the 42-volt standard for vehicle electrical systems.

In the starter mode, the control unit controls the component in such a way that the voltage drop between the power terminals of the component is as small as possible. In this way, the open-circuit voltage of the first battery is optimally utilized for supplying the load system.

In the generator mode, the control unit controls the DC/AC transformer in such a way that the voltage at both inputs of the DC/AC transformer increases if the energy converter reaches its power limit, e.g. due to an excessive power demand from the load system. The power limit is consequently increased such that the energy converter can again adequately supply the load system. In order to ensure that the first battery is not damaged or destroyed by the voltage increase, the control unit also controls the component in such a way that a voltage drop which is sufficient to protect the first battery occurs at the component. The voltage which is used to charge the first battery is thereby reduced to safe and suitable values.

Since the first battery and the component form a series circuit, which is connected in parallel with the load system, the power loss of the component is proportional to the voltage drop at the component and to the current through the component. The current through the component is relatively small, because most of the current from the DC/AC transformer is conducted through the load system and not through the series circuit comprising the first battery and component. Consequently, the power loss at the component is low.

The component has no internal energy store since it has exactly two power terminals. It is therefore a simple and inexpensive element. The variable voltage drop at the component is achieved by means of a variable electrical resistor. The component could be a transistor, for example, which allows current to pass in both directions, e.g. a MOSFET transistor whose gate electrode is connected to the control unit.

The component can include a parallel circuit comprising a transistor or a fixed resistor and a relay. In the starter mode, this has the advantage that the relay can short-circuit the residual resistance of the fully opened transistor or the resistor, whereby the open-circuit voltage of the first battery can be optimally utilized for the load system and for charging the capacitor. The relay is connected to the control unit for this purpose.

The component can include a parallel circuit comprising a plurality of transistors.

The component preferably includes a protection and matching circuit which is connected ahead of the gate electrode of the transistor and protects the component against voltages which are too high.

The voltage at the DC-side input of the DC/AC transformer can be adjusted continuously or incrementally. The same applies for the voltage drop at the component.

In order to supply a further load system with a smaller load, it is advantageous if the circuit arrangement includes two further battery terminals for a second battery. In this case, the circuit arrangement includes a DC/DC transformer. When connecting the second battery, the second battery is connected in parallel with the first input of the DC/DC transformer. The second input of the DC/DC transformer is connected in parallel with the DC-side input of the DC/AC transformer. The circuit arrangement or the vehicle electrical system outside the circuit arrangement includes one or two further terminals via which the further load system can be connected in parallel with the first input of the DC/DC transformer. The open-circuit voltage of the second battery is lower than the open-circuit voltage of the first battery.

The energy converter can be configured, for example, as an asynchronous, synchronous, reluctance or axial flow machine.

BRIEF DESCRIPTION OF THE DRAWINGS

An exemplary embodiment of the invention is explained in greater detail below and with reference to the figures.

FIG. 1 shows the circuit diagram of a vehicle electrical system having a first battery, a second battery, an energy converter and a circuit arrangement including a component, terminals for a load system, a capacitor, a DC/DC transformer, a DC/AC transformer, a control unit, battery terminals for the first battery and for the second battery, and terminals for a further load system.

FIG. 2 shows a further component comprising a transistor and a relay.

DETAILED DESCRIPTION OF THE PREFERRED EMBODIMENTS

In the exemplary embodiment, a vehicle electrical system is provided with an integrated starter-generator which includes a first battery B1 having an open-circuit voltage of 36 volts and a second battery B2 having an open-circuit voltage of 12 volts. The starter-generator also includes an energy converter E which is configured as an asynchronous machine (cf. FIG. 1).

A circuit arrangement SA for the starter-generator has two battery terminals BA1, BA2 for the first battery B1. The circuit arrangement SA also has two battery terminals BA3, BA4 for the second battery B2.

The circuit arrangement SA has a DC/AC transformer DAW, whose AC-side input is connected to the energy converter E. The DC-side input of the DC/AC transformer DAW is arranged in parallel with a capacitor K.

The circuit arrangement SA has terminals A, BA2 via which a load system VS can be connected in parallel with the DC-side input of the DC/AC transformer DAW. One of the terminals BA2 is identical to one of the battery terminals BA2 of the first battery B1 and is used jointly by the first battery B1 and the load system VS.

Together with the first battery B1, a component T which is configured as a transistor forms a series circuit which is connected in parallel with the DC-side input of the DC/AC transformer DAW. The component has two power terminals LA and a control terminal STA at the gate electrode of the transistor.

In addition to the circuit arrangement SA, the vehicle electrical system has two further terminals A', via which a further load system VS' is connected in parallel with the second battery B2. The second battery B2 is additionally connected in parallel with a first input of a DC/DC transformer DDW of the circuit arrangement SA. The second input of the DC/DC transformer DDW is connected in parallel with the capacitor K.

The circuit arrangement SA has a control unit SE which is connected to the gate electrode of the component T, to the DC/DC transformer DDW, to the DC/AC transformer DAW, and to the energy converter E.

If the starter-generator is not operated as a generator, the first battery B1 supplies the load system VS with energy and supplies the DC/AC transformer DAW with energy. At the same time the second battery B2 supplies the further load system VS' with energy and can likewise supply the DC/AC transformer DAW with energy. For this purpose, the control unit controls the DC/DC transformer DDW in such a way that the low voltage at the second battery B2 is converted into a high voltage which corresponds to the voltage of the first battery B1. If the charge state of the first battery B1 is low, the second battery B2 can charge the first battery B1 via the DC/DC transformer DDW. The first battery B1 can likewise charge the second battery B2 via the DC/DC transformer DDW if the charge state of said second battery B2 is low. In order that the voltage of the first battery B1 can be optimally utilized, the control unit controls the component T in such a way that the transistor is fully opened. The component therefore has a minimum electrical resistance, and the voltage drop at the component is consequently very small.

In the generator mode of the starter-generator, the energy converter E takes over the supply of the load system VS and of the further load system VS'. This occurs by converting voltage which is generated by the energy converter E into a d.c. voltage by means of the DC/AC transformer DAW. In the generator mode, the first battery B1 and the second battery B2 are also charged if the current consumption of the corresponding load system VS, VS' is less than the current supplied by the DC/AC transformer DAW. However, the DC/DC transformer DDW can also work in any direction in the generator mode.

If the control unit SE detects that the power limit of the energy converter E has been reached, e.g. due to a particularly high power requirement of the load system VS or due to a very high rotational speed of the energy converter E, the DC/AC transformer DAW is controlled in such a way that the voltage at both inputs of the DC/AC transformer DAW is increased in accordance with the required power. The increase is approximately 3 to 6 volts.

In order to protect the first battery B1 against an excessive charge voltage, the control unit SE simultaneously controls the component T in such a way that a sufficiently high voltage drop occurs at the component. The voltage drop is typically 3 to 6 volts. The component therefore isolates the voltage at the first battery B1 from the voltage at the DC-side input of the DC/AC transformer DAW. For this purpose, the control unit SE controls the component T in such a way that a constant voltage, namely 42 volts, is essentially present at the first battery B1, irrespective of the voltage at the DC-side input of the DC/AC transformer DAW.

The control unit SE also controls the DC/DC transformer DDW in order to convert the increased voltage correctly into the voltage required for the second battery B2, e.g. 14 volts.

Instead of being configured as a transistor, the component can be a parallel circuit comprising a transistor T' and a relay R (cf. FIG. 2). Such a component likewise has two power terminals LA'. Furthermore, the component has three control terminals STA1, STA2, STA3. The first control terminal STA1 is connected to the gate electrode of the transistor T', while the second control terminal STA2 and the third control terminal STA3 are connected to the coil of the relay R. All control terminals STA1, STA2, STA3 are connected to the control unit.

What is claimed is:

1. A circuit arrangement for a generator, particularly an integrated starter-generator, comprising:
   two battery terminals for a first battery,
   at least one DC/AC transformer, whose AC-side input can be connected to an energy converter,
   a component comprising at least two power terminals and at least one control terminal for isolating the voltage at the first battery from the voltage at the DC-side input of the DC/AC transformer, wherein a voltage drop between the power terminals can be varied continuously or incrementally via the control terminal,
   a control unit which is connected to the control terminal of the component,
   at least one terminal via which a load system can be connected directly in parallel with the DC-side input of the DC/AC transformer, and
   wherein, when the first battery is connected, a series circuit is formed by the first battery and the component via its power terminals, said series circuit being connected in parallel with the DC-side input of the DC/AC transformer and in parallel with the load system at the same time.

2. The circuit arrangement as claimed in claim 1, in which the component includes at least one MOSFET transistor.

3. The circuit arrangement as claimed in claim 1, wherein the component is a parallel circuit comprising a transistor and a relay, and the component has three control terminals, of which the first control terminal is connected to the transistor and the second control terminal and the third control terminal are connected to the relay.

4. The circuit arrangement as claimed in claim 1, further comprising:
   two further battery terminals for a second battery,
   a DC/DC transformer,
   wherein, when the second battery in connected, the second battery is connected in parallel with the first input of the DC/DC transformer, and the second input of the DC/DC transformer is connected in parallel with the DC-side input of the DC/AC transformer.

5. A generator having a circuit arrangement comprising:
   two battery terminals for a first battery,
   at least one DC/AC transformer, whose AC-side input can be connected to an energy converter,
   a component comprising at least two power terminals and at least one control terminal for isolating the voltage at the first battery from the voltage at the DC-side input of the DC/AC transformer, wherein a voltage drop between the power terminals can be varied continuously or incrementally via the control terminal,
   a control unit which is connected to the control terminal of the component,
   at least one terminal via which a load system can be connected directly in parallel with the DC-side input of the DC/AC transformer,
   wherein, when the first battery is connected, a series circuit is formed by the first battery and the component via its power terminals, said series circuit being connected in parallel with the DC-side input of the DC/AC transformer and in parallel with the load system at the same time, and wherein
   the generator is configured as an integrated starter-generator.

6. The generator as claimed in claim 5, in which the component includes at least one MOSFET transistor.

7. The generator as claimed in claim 5, wherein the component is a parallel circuit comprising a transistor and a relay, and the component has three control terminals, of which the first control terminal is connected to the transistor and the second control terminal and the third control terminal are connected to the relay.

8. The generator as claimed in claim 5, further comprising:
   two further battery terminals for a second battery,
   a DC/DC transformer,
   wherein, when the second battery in connected, the second battery is connected in parallel with the first input of the DC/DC transformer, and the second input of the DC/DC transformer is connected in parallel with the DC-side input of the DC/AC transformer.

9. A vehicle electrical system comprising:
   a generator having a circuit arrangement comprising:
     two battery terminals for a first battery,
     at least one DC/AC transformer, whose AC-side input can be connected to an energy converter,
     a component comprising at least two power terminals and at least one control terminal for isolating the voltage at the first battery from the voltage at the DC-side input of the DC/AC transformer, wherein a voltage drop between the power terminals can be varied continuously or incrementally via the control terminal,
     a control unit which is connected to the control terminal of the component,
     at least one terminal via which a load system can be connected directly in parallel with the DC-side input of the DC/AC transformer,
     wherein, when the first battery is connected, a series circuit is formed by the first battery and the component via its power terminals, said series circuit being connected in parallel with the DC-side input of the DC/AC transformer and in parallel with the load system at the same time, wherein the first battery is connected to the two battery terminals, the energy converter is connected to the AC-side input of the DC/AC transformer, and wherein the voltage at the DC-side input of the DC/AC transformer is not higher than a predefined voltage at any time.

10. The vehicle electrical system as claimed in claim 9, in which the energy converter is configured as an asynchronous machine.

11. The vehicle electrical system as claimed in claim 6, wherein the second battery is connected to the two further battery terminals, and wherein the open-circuit voltage of the second battery is lower than the open-circuit voltage of the first battery.

12. An operating method for a vehicle electrical system, comprising the steps of:

providing a first battery, providing a DC/AC transformer having a DC-side input, providing a component having two power terminals for varying a voltage drop across the terminals, isolating the voltage at the first battery from the voltage at the DC-side input of the DC/AC transformer, varying a voltage drop between the power terminals continuously or incrementally, controlling the component in such a way that a constant voltage is essentially present at the first battery, irrespective of the voltage at the DC-side input of the DC/AC transformer.

\* \* \* \* \*

UNITED STATES PATENT AND TRADEMARK OFFICE
CERTIFICATE OF CORRECTION

| | | |
|---|---|---|
| PATENT NO. | : 6,768,220 B2 | Page 1 of 1 |
| APPLICATION NO. | : 10/632182 | |
| DATED | : July 27, 2004 | |
| INVENTOR(S) | : Hans-Peter Johanning | |

It is certified that error appears in the above-identified patent and that said Letters Patent is hereby corrected as shown below:

Column 1,
Lines 7-10, delete and replace with the following:
-- This application is a continuation of copending International Application No. PCT/DE02/00316 filed January 29, 2002, which designates the United States and claims priority to German application number DE10106622.8 filed February 13, 2001. --.

Signed and Sealed this

Twentieth Day of June, 2006

JON W. DUDAS
*Director of the United States Patent and Trademark Office*